No. 611,010. Patented Sept. 20, 1898.
F. L. GREGORY.
PANORAMIC CAMERA.
(Application filed June 11, 1897.)
(No Model.) 2 Sheets—Sheet 1.
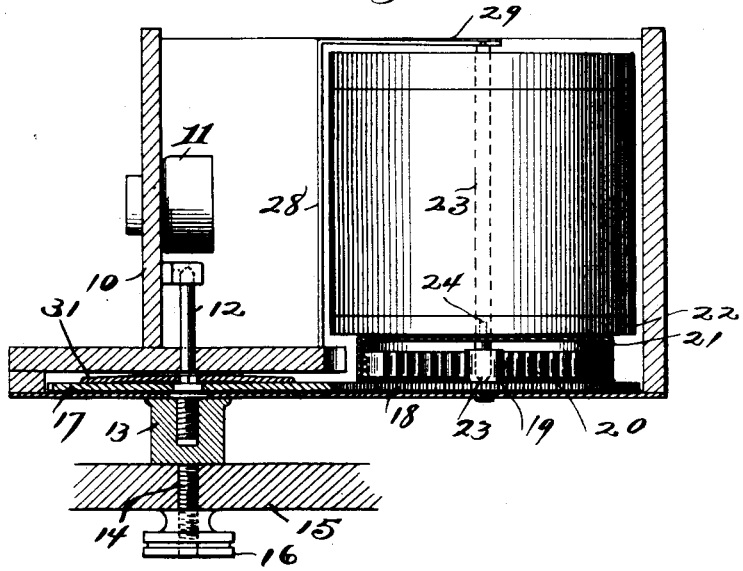
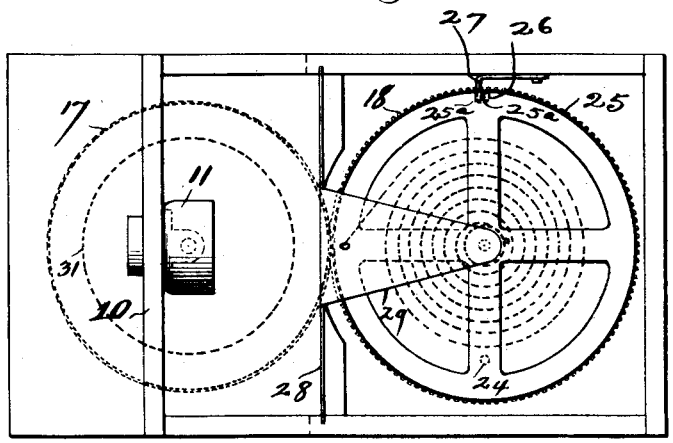
Witnesses,
Inventor,
Fred L. Gregory
By Offield, Towle & Linthicum
Attys.

No. 611,010. Patented Sept. 20, 1898.
F. L. GREGORY.
PANORAMIC CAMERA.
(Application filed June 11, 1897.)
(No Model.) 2 Sheets—Sheet 2.
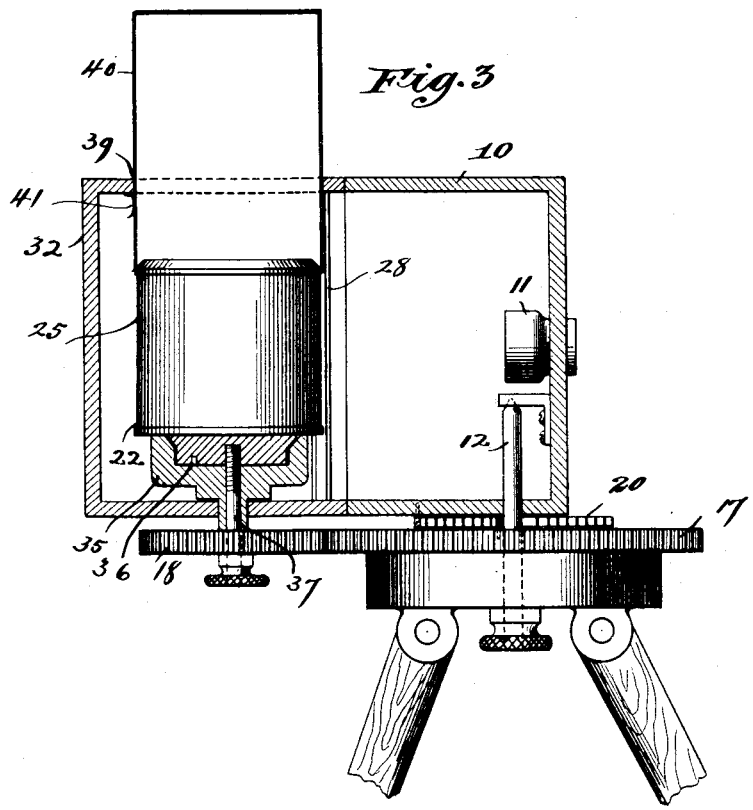
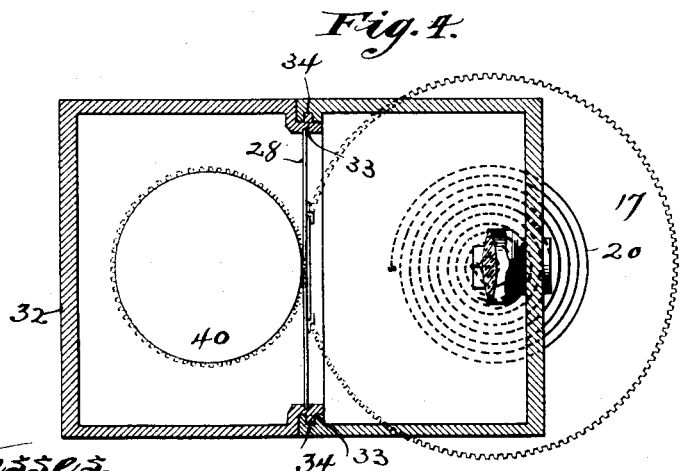
Witnesses, Inventor,
Fred L. Gregory
By Offield, Towle &...
Atty's.

UNITED STATES PATENT OFFICE.

FRED L. GREGORY, OF CHICAGO, ILLINOIS.

PANORAMIC CAMERA.

SPECIFICATION forming part of Letters Patent No. 611,010, dated September 20, 1898.

Application filed June 11, 1897. Serial No. 640,329. (No model.)

*To all whom it may concern:*

Be it known that I, FRED L. GREGORY, of Chicago, Illinois, have invented certain new and useful Improvements in Photographic Cameras, of which the following is a specification.

This invention relates to certain improvements in photographic cameras, and more particularly to the provision of a simple camera or camera attachment whereby panoramic views may be taken and which may be used with plates. My invention is shown in these two forms in the accompanying drawings, in which—

Figures 1 and 2 are respectively a sectional elevation and a plan view of a panoramic camera embodying some of my improvements; and Figs. 3 and 4 are similar views of a camera adapted, as shown, for taking panoramic views, but which may be used for plates.

Referring first to the construction shown in Figs. 1 and 2, let 10 represent the case or box, in the front wall of which is mounted a lens-holder 11, containing a suitable lens. 12 represents a pivot upon which the box or case is rotatably mounted. Said pivot is threaded upon its lower end, and a block 13, having a threaded aperture, is turned thereon, said block having a threaded shank 14, which may extend through a suitable support—as, for example, the top plate 15 of a tripod-frame—and a cap-nut 16 is applied to the extended threaded end of the stud 14. The particular arrangement of the pivot and the manner of its mounting are of course mere matter of structural detail. This pivot-pin has secured thereto a gear-wheel 17, and said gear-wheel has peripheral toothed engagement with the gear 18, loosely mounted upon a stud 19, which is fixed to the base of the frame. The said stud affords a support or rigid point of attachment for one end of a spring 20, the outer end of the spring being secured with its spring-barrel 21 to gear 18. Drum 22 has a central pivot 23 stepped into the hollow of the stud 19, while a pin 24 secures the drum to the spring-barrel and thereby produces by the winding action of the spring a rotary movement of the drum. The spring is tensioned by the bodily movement of the camera-box in adjusting it to an operative position, as will be hereinafter described. The film is indicated by the line 25 and may be of such length as to cover the periphery of the drum, its edges being secured, as shown at 25ª, in a slot or other equivalent provision. A stop-pin 26 on the gear 18 is engaged by a lug or arm 27 on the box or case, so as to arrest the drum at the completion of each revolution. The screen is represented at 28 and is, as is shown, provided at its upper end with an overhanging arm 29, in the rear end of which the drum-shaft 23 is journaled. The screen has a narrow slot, and the width of this slot will of course determine the area of sensitive film which is exposed at a given instant of time. The width of this slot will be proportioned to the exposure desired and to the speed of the movement of the camera. A friction-disk 31 is mounted upon the pivot 12 and bears upon the upper surface of the gear 17, and this serves to overcome the momentum of the box due to the action of the spring, and thereby to bring the box gradually and gently to rest after it has completed its operative revolution. The operation of this form of apparatus is simple and will be readily understood. The operator places his camera in position and energizes the spring by turning the camera on its pivot through the circle or arc of a circle which it is desired to photograph. Having exposed the film, he releases the box and the spring turns the box back to the starting-point, at the same time through the gears effecting a rotary movement of the drum independently of the movement of the box. During this operation the lens takes in the objects within its range and the image is reproduced upon the film, the successive portions of which are exposed by the combined movement of the camera and of the drum carrying the film. Thus the camera may be moved through a complete circle and all of the objects within the boundary of the circle will be reproduced upon the film carried by the drum. The above-described form of apparatus is exceedingly simple in construction, the connections of the operating mechanism being direct and positive, inexpensive and efficient.

The form of camera shown in Figs. 3 and 4 is one which, while it is adapted for use in taking panoramic views, may be readily adapted for plates and for general use and which may be unloaded and reloaded without the use of a dark room. In this construction the case or box 10 is formed in two parts or sections, the rear section 32 being removably connected to the front section by means of tongues 33, which fit within grooves 34 on the inner sides of said front section. This rear section 32 carries the drum 22, which is removably mounted on a disk or head 35, connected and moving with the gear 18. A pin 36 on the head 35 enters the end of the drum 22 and insures the joint rotation of the two parts, which are further connected by the threaded pin 37, which screws into the end of the drum. The disk or head 35 is provided with a recess or seat 38 in its upper face to receive the correspondingly-shaped lower end of the drum 22 and properly center the same. The drum is inserted and removed through a circular aperture 39 in the top of the rear section 32 of the case or box and is provided with a slip-cover 40, which fits snugly over the drum and its film and protects the latter from the light. This cover also fits the aperture 39 snugly, so as to prevent light from entering the case when the drum and its cover are inserted in the case, and more particularly when the cover is partially withdrawn from the drum to expose the film, as shown in Fig. 3. A spring 41 serves by its frictional contact with the cover to hold the latter in whatever position it may be placed. The screen 28 is mounted in and carried by the removable rear section 32 of the case.

The actuating-spring 20, instead of being connected to the gear 18, may be connected to the gear 17, and in Figs. 3 and 4 I have shown such a construction, said spring having one of its ends secured to the fixed gear 17 and its other end secured to the rotatable case 10. Of course it will be understood that the spring may be located and connected in either of the two modes shown in either of the two forms of camera which I have described.

Bearing in mind the description of the mode of operation of the structure shown in Figs. 1 and 2 the general operation of the camera shown in Figs. 3 and 4 will be readily understood. By means of a plurality of drums 22, having slip-covers 40, it is obvious that a number of pictures may be taken without taking the camera to a dark room to unload and reload it, since each drum may be inserted, its cover partly withdrawn, as shown in Fig. 3, the exposure made in the manner already described, and the slip-cover replaced, the entire drum, film, and cover being removed and another drum, film, and cover inserted in their place. Moreover, if it be deemed desirable, the entire rear section 32 of the case 10 may be removed and the remaining structure used as an ordinary camera, the plate-holder and plate being inserted in the grooves 34, which are adapted to receive the same.

I claim—

1. In a photographic camera, the combination, with a box or casing, having a fixed axis whereon it is mounted to rotate and a lens located in the axis of rotation, of a fixed gearing concentric with said axis, a cylindrical film-holder rotatably mounted eccentric to said axis, and a gear connected with the film-holder to actuate the same and operatively connected with the fixed gear, substantially as set forth.

2. In a photographic camera, the combination, with a box or casing having a fixed axis whereon it is mounted to rotate and a lens located in the axis of rotation, of a fixed gear concentric with said axis, a cylindrical film-holder rotatably mounted eccentric to said axis, a movable gear connected with the film-holder and meshing with the fixed gear, and a coiled spring connected at one end with the box or casing and at the other with one of said gears to simultaneously rotate the box or casing and the film-holder, substantially as set forth.

3. In a panoramic camera, the combination, with a rotatable box or casing having a lens located in the axis of rotation, of a rotating disk or head adapted to receive and hold a film-holder, the box or casing being provided with an aperture opposite said disk or head, and a cylindrical film-holder adapted to be detachably connected with the disk or head and having a slip-cover to fit and close the aperture in the casing, substantially as set forth.

4. In a photographic camera, a box or casing made in two sections, a front section rotatably mounted, having a lens located in the axis of rotation and having internal grooves at its rear, and a detachable rear section carrying a rotatable film-holder and having tongues to engage the grooves of the front section, substantially as set forth.

FRED L. GREGORY.

Witnesses:
B. E. RYAN,
GEO. RHORER.